United States Patent
Muramatsu et al.

(10) Patent No.: US 9,676,060 B2
(45) Date of Patent: Jun. 13, 2017

(54) METHOD FOR TREATING CU THIN SHEET

(71) Applicant: NGK INSULATORS, LTD., Nagoya (JP)

(72) Inventors: Naokuni Muramatsu, Nagoya (JP); Shoju Aoshima, Fujieda (JP)

(73) Assignee: NGK Insulators, Ltd., Nagoya (JP)

( * ) Notice: Subject to any disclaimer, the term of this patent is extended or adjusted under 35 U.S.C. 154(b) by 148 days.

(21) Appl. No.: 14/032,699

(22) Filed: Sep. 20, 2013

(65) Prior Publication Data

US 2014/0079891 A1  Mar. 20, 2014

Related U.S. Application Data

(63) Continuation of application No. PCT/JP2012/055649, filed on Mar. 6, 2012.

(30) Foreign Application Priority Data

Mar. 24, 2011 (JP) .................. 2011-066597

(51) Int. Cl.
  *B23K 26/32* (2014.01)
  *B23K 35/00* (2006.01)
  (Continued)

(52) U.S. Cl.
  CPC .............. *B23K 26/32* (2013.01); *B22F 7/04* (2013.01); *B23K 26/342* (2015.10);
  (Continued)

(58) Field of Classification Search
  CPC ......... C23C 24/10; C23C 14/28; C23C 26/02; C23C 30/00; B23K 35/00; B23K 2203/00;
  (Continued)

(56) References Cited

U.S. PATENT DOCUMENTS 4,612,208 A   9/1986 Reichenecker
6,346,133 B1 * 2/2002 Narasimhan ........ C22C 33/0228
                                                           419/17
(Continued)

FOREIGN PATENT DOCUMENTS

CN   101215701 A   7/2008
JP   60-238487 A1  11/1985
(Continued)

OTHER PUBLICATIONS

European Search Report, European Application No. 12761166.3, dated Sep. 3, 2014 (4 pages).
(Continued)

*Primary Examiner* — David Turocy
*Assistant Examiner* — Mohammad Mayy
(74) *Attorney, Agent, or Firm* — Burr & Brown, PLLC

(57) ABSTRACT

A method for treating a Cu thin sheet is provided. The method comprises the steps of: supplying a slurry in which a diffusion bonding aid (DBA), such as Ni powder, and a reinforcing material (RM), such as a carbide base metal compound, are dispersed in a solvent to a predetermined portion on a Cu or Cu base alloy thin sheet, drying the supplied slurry, and applying a laser to induce melting, solidification, and fixation, so as to form a buildup layer. In the method, the weight ratio of DBA to RM is specified to be 80:20 to 50:50, and the median diameters $D_{50}$ of both DBA and RM employed fall within 0.1 to 100 μm, the median diameter $D_{50}$ of DBA is larger than the median diameter $D_{50}$ of RM, and both the distribution ratio $D_{90}/D_{10}$ of DBA and the distribution ratio $D_{90}/D_{10}$ of RM are 4.0 or less.

2 Claims, 6 Drawing Sheets

(51) Int. Cl.

| | |
|---|---|
| *B23K 35/02* | (2006.01) |
| *C23C 24/10* | (2006.01) |
| *C22C 9/00* | (2006.01) |
| *C22C 9/06* | (2006.01) |
| *C22C 16/00* | (2006.01) |
| *C22C 19/05* | (2006.01) |
| *C22C 19/07* | (2006.01) |
| *C22C 45/10* | (2006.01) |
| *B23K 35/30* | (2006.01) |
| *B23K 26/342* | (2014.01) |
| *B23K 103/12* | (2006.01) |
| *B22F 7/04* | (2006.01) |
| *C22C 1/04* | (2006.01) |
| *C22C 32/00* | (2006.01) |
| *B23K 103/18* | (2006.01) |
| *B23K 103/04* | (2006.01) |

(52) U.S. Cl.
CPC .......... *B23K 35/007* (2013.01); *B23K 35/025* (2013.01); *B23K 35/0244* (2013.01); *B23K 35/3033* (2013.01); *C22C 9/00* (2013.01); *C22C 9/06* (2013.01); *C22C 16/00* (2013.01); *C22C 19/056* (2013.01); *C22C 19/058* (2013.01); *C22C 19/07* (2013.01); *C22C 45/10* (2013.01); *C23C 24/10* (2013.01); *B22F 2007/047* (2013.01); *B22F 2998/00* (2013.01); *B22F 2998/10* (2013.01); *B23K 2203/05* (2015.10); *B23K 2203/12* (2013.01); *B23K 2203/18* (2013.01); *B23K 2203/26* (2015.10); *C22C 1/0433* (2013.01); *C22C 1/0458* (2013.01); *C22C 32/0052* (2013.01)

(58) Field of Classification Search
CPC ... C22C 19/00; C22C 9/00; C22C 1/00; B22F 7/00; B22F 2007/00; B22F 2998/00

USPC .................................................. 427/597, 554
See application file for complete search history.

(56) References Cited

U.S. PATENT DOCUMENTS

| | | | |
|---|---|---|---|
| 6,436,470 B1* | 8/2002 | Iacocca | C23C 2/28 427/180 |
| 2002/0004105 A1 | 1/2002 | Kunze et al. | |
| 2008/0220234 A1 | 9/2008 | Ko et al. | |
| 2008/0226843 A1* | 9/2008 | Fukubayashi et al. | 427/597 |
| 2010/0297432 A1* | 11/2010 | Sherman et al. | 428/325 |

FOREIGN PATENT DOCUMENTS

| | | | |
|---|---|---|---|
| JP | 01-118397 | A1 | 5/1989 |
| JP | 61-245988 | A1 | 11/1996 |
| JP | 2001-049467 | A1 | 2/2001 |
| JP | 2003-518193 | A1 | 6/2003 |
| JP | 2005-254317 | A1 | 9/2005 |
| JP | 2008-534788 | A1 | 8/2008 |
| JP | 2008-214704 | A1 | 9/2008 |
| JP | 2008-264842 | A1 | 11/2008 |
| JP | 4178374 | B2 | 11/2008 |
| JP | 2008-546909 | A1 | 12/2008 |
| WO | 2006/130380 | A2 | 12/2006 |
| WO | 2007/002017 | A1 | 1/2007 |
| WO | 2010/135721 | A2 | 11/2010 |

OTHER PUBLICATIONS

Tian, F.J., et al. "Study for Laser Cladding of Ni60A on Copper Substrate by Laser," Key Engineering Materials, vol. 392-394, Oct. 2008, pp. 125-130.
International Search Report and Written Opinion dated Apr. 3, 2012.
Chinese Office Action and Search Report (Application No. 201280014995.6) dated Nov. 4, 2014 (with English translation).

* cited by examiner (a)

(b)

METHOD FOR TREATING CU THIN SHEET

BACKGROUND OF THE INVENTION

1. Field of the Invention

The present invention relates to a method for treating a Cu thin sheet.

2. Description of the Related Art

Electrical contact materials, e.g., motor brushes, are required to have various types of additional durability, e.g., abrasion resistance, stress relaxation resistance, corrosion resistance, and weatherability, besides basic characteristics, e.g., electrical conductivity and mechanical strength, in accordance with the use of parts. In many cases, these various types of durability are locally required at a special position around an area serving as a contact. In such a case, usually, plating, roll cladding, thermal spraying, or the like of a different type of material is applied to a whole base material to produce a thin sheet composite material and, subsequently, an electrical contact is obtained by press-cutting or bending. This is because, in many cases, the cost contrarily increases by producing a local composite material at a specific position through masking or the like. However, it is necessary that the part design of the electrical contact which is a composite material as a whole be performed on the basis of the basic characteristics of the composite material, and there is a disadvantage that the part design on the basis of the known material characteristics of a commercially available alloy serving as a base material is not utilized on an as-is basis.

In this regard, PTL 1 discloses a method for attaching a metal powder to a base substance by using a laser. Specifically, in the disclosed method, a design region on the base substance is covered with a mixture in which granular silver is mixed with lamp black, the resulting mixture is irradiated with a laser and, thereby, a buildup layer is formed locally. According to this method, a base substance locally reinforced by a buildup layer containing silver as a primary component can be obtained.

Meanwhile, PTL 2 describes a method in which a powder containing a metal and a reinforcing material is supplied to a substrate, the powder is heat-melted by application of a laser and, thereafter, cooling is performed, so as to form an article having a fine-grained structure. Nickel and nickel alloys are shown as examples of metals, and borides and carbides are shown as examples of reinforcing materials. It is also possible by this method to obtain a base substance locally reinforced by a buildup layer of a fine-grained structure.

Furthermore, PTL 3 describes a method in which a mixture produced by mixing 80 to 99 percent by mass of powder containing 7 to 20 percent by mass of Ni and 1 to 20 percent by mass of powder containing Mo and Co is built up by a laser. It is also possible by this method to obtain a base substance locally reinforced by a buildup layer.

CITATION LIST

Patent Literature

PTL 1: JP 61-245988 A
PTL 2: JP 2003-518193 A (Translation of PCT Application)
PCT 3: JP 2008-264842 A

SUMMARY OF THE INVENTION

The above-described electrical contact material is required to maintain the contact pressure for a long term while the load is applied. Specifically, it is desired that a stress relaxation rate is reduced by locally forming a buildup layer on the Cu thin sheet utilized as an electrical contact material.

Although PTLs 1 to 3 describe the point that the buildup layer is locally formed by applying the laser to the powder, a manufacturing method suitable for reducing the stress relaxation rate of the Cu thin sheet locally including the buildup layer has not been studied.

The present invention has been made to solve the above-described problems and it is a main object to reduce the stress relaxation rate while the material characteristics of a Cu thin sheet are capitalized.

Solution to Problem

A first method for treating a Cu thin sheet according to the present invention is a method for treating a Cu thin sheet, the method comprising the steps of: supplying a slurry in which a diffusion bonding aid and a reinforcing material are dispersed in a solvent to a predetermined portion on a Cu or Cu base alloy thin sheet, drying the supplied slurry, and applying a laser to induce melting, solidification, and fixation, so as to form a buildup layer, wherein (a) a Ni or Ni—Cr alloy powder is used as the diffusion bonding aid, (b) a carbide base metal compound, a nitride base metal compound, or a boride base metal compound is used as the reinforcing material, and the weight ratio of the diffusion bonding aid to the reinforcing material is specified to be 80:20 to 50:50, and (c) the median diameters $D_{50}$ of both the diffusion bonding aid and the reinforcing material fall within 0.1 to 100 μm, the median diameter $D_{50}$ of the diffusion bonding aid is larger than the median diameter $D_{50}$ of the reinforcing material, and both the distribution ratio $D_{90}/D_{10}$ of the diffusion bonding aid and the distribution ratio $D_{90}/D_{10}$ of the reinforcing material are 4.0 or less.

A second method for treating a Cu thin sheet according to the present invention is a method for treating a Cu thin sheet, the method comprising the steps of: supplying a slurry in which a diffusion bonding aid and a reinforcing material are dispersed in a solvent to a predetermined portion on a Cu or Cu base alloy thin sheet, drying the supplied slurry, and applying a laser to induce melting, solidification, and fixation, so as to form a buildup layer, wherein (a) a Ni or Ni—Cr alloy powder is used as the diffusion bonding aid, (b) a stainless steel alloy, a Hastelloy Ni base alloy, or a Stellite Co base alloy is used as the reinforcing material, and the weight ratio of the diffusion bonding aid to the reinforcing material is specified to be 50:50 to 1:99, and (c) the median diameters $D_{50}$ of both the diffusion bonding aid and the reinforcing material fall within 0.1 to 100 μm, the median diameter $D_{50}$ of the diffusion bonding aid is larger than the median diameter $D_{50}$ of the reinforcing material, and both the distribution ratio $D_{90}/D_{10}$ of the diffusion bonding aid and the distribution ratio $D_{90}/D_{10}$ of the reinforcing material are 4.0 or less.

A third method for treating a Cu thin sheet according to the present invention is a method for treating a Cu thin sheet, the method comprising the steps of: supplying a slurry in which a diffusion bonding aid and a reinforcing material are dispersed in a solvent to a predetermined portion on a Cu or Cu base alloy thin sheet, drying the supplied slurry, and applying a laser to induce melting, solidification, and fixation, so as to form a buildup layer, wherein (a) a Ni or Ni—Cr alloy powder is used as the diffusion bonding aid, (b) Zr—Cu—Al—Ni Zr base alloy is used as the reinforcing material, and the weight ratio of the diffusion bonding aid to the reinforcing material is specified to be 50:50 to 5:95, and (c) the median diameters $D_{50}$ of both the diffusion bonding aid and the reinforcing material fall within 0.1 to 100 µm, the median diameter $D_{50}$ of the diffusion bonding aid is larger than the median diameter $D_{50}$ of the reinforcing material, and both the distribution ratio $D_{90}/D_{10}$ of the diffusion bonding aid and the distribution ratio $D_{90}/D_{10}$ of the reinforcing material are 4.0 or less.

Advantageous Effects of Invention

According to the first to third methods for treating a Cu thin sheet of the present invention, a Cu thin sheet having a low stress relaxation rate can be provided. That is, the Cu thin sheets produced by the first to third methods are provided with buildup layers, and the stress relaxation rate is reduced as compared with that of a Cu thin sheet not provided with a buildup layer. In every case where the Cu thin sheet provided with the buildup layer is used as a spring material for electronic parts, e.g., connectors, switches, and relays, it is required that the contact pressure is maintained for a long term while the load is applied. The Cu thin sheets obtained by the first to third methods for treating a Cu thin sheet, according to the present invention, can respond to such a requirement sufficiently because the stress relaxation rate is reduced.

DETAILED DESCRIPTION OF THE INVENTION

Figure 1:
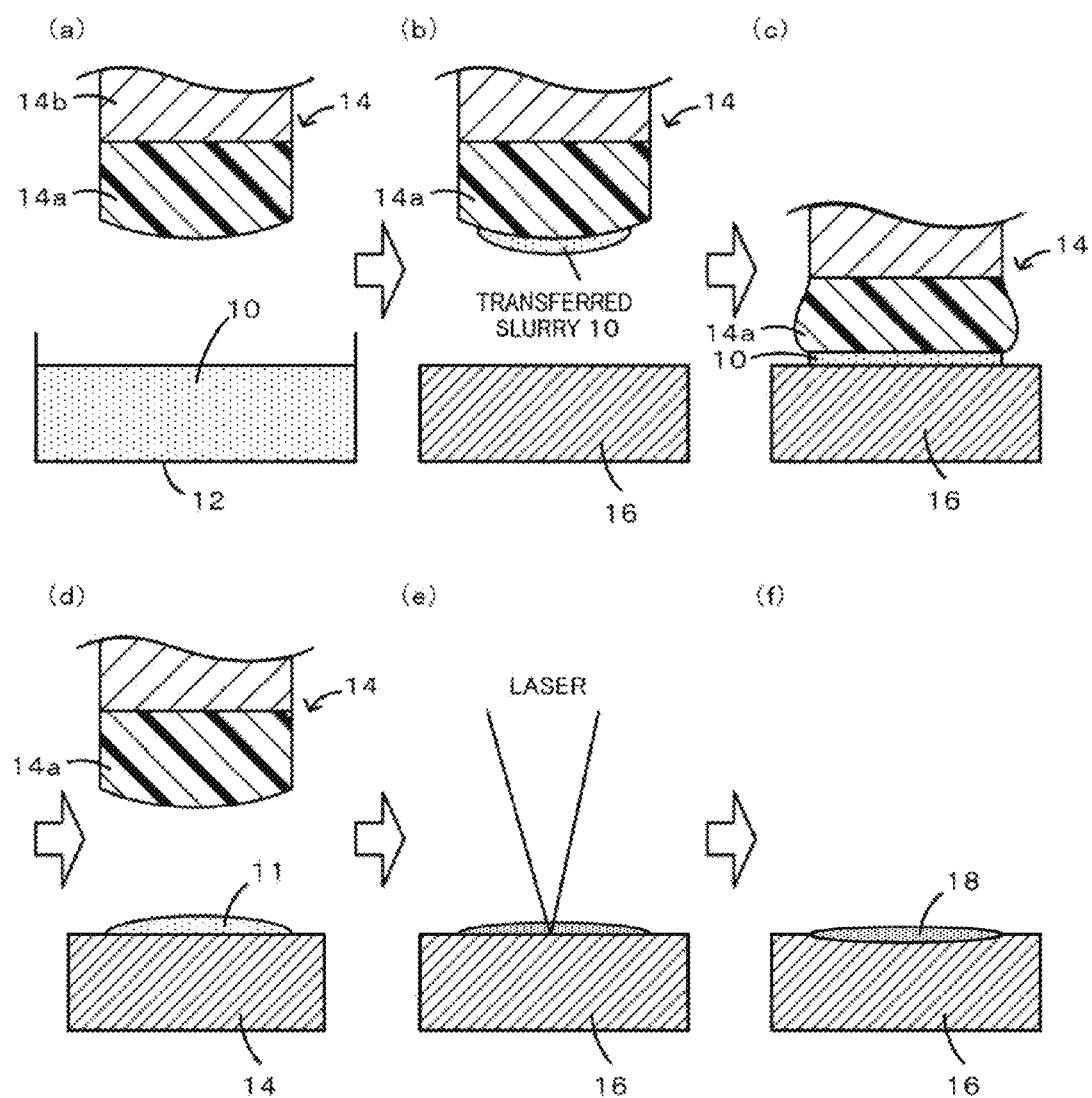
FIG. 1 is an explanatory diagram showing the procedure of a method for treating a Cu thin sheet.

In the first to third methods for treating a Cu thin sheet according to the present invention, examples of thin sheets made from Cu or Cu base alloy include thin sheets used for electrical contacts. Such a thin sheet for an electrical contact is required to maintain the contact pressure for a long term while the load is applied. Such a thin sheet is in the shape of, for example, a tape. In this regard, the Cu base alloy refers to an alloy containing 50 percent by weight or more of Cu.

In the first to third methods for treating a Cu thin sheet according to the present invention, when a buildup layer is formed, a method in which a slurry prepared by dispersing a diffusion bonding aid and a reinforcing material into a solvent is supplied to a predetermined portion on the thin sheet, the supplied slurry is dried and, thereafter, a laser is applied to induce melting, solidification, and fixation is adopted. In the application of the laser, melting and solidification may be induced while an inert gas to prevent oxidation is blown. However, if a powder material is used on an as-is basis, scattering occurs because of the inert gas and an impact resulting from laser irradiation, and it becomes difficult to form a buildup layer at a predetermined place. On the other hand, in the present invention, a buildup layer is formed at a predetermined place easily because the powder is supplied after being made into a slurry.

In the first to third methods for treating a Cu thin sheet according to the present invention, as described in the item (a), a Ni or Ni—Cr alloy is used as the diffusion bonding aid. The buildup layer diffuses into the Cu thin sheet easily by the presence of Ni. Meanwhile, in the case where a Ni—Cr alloy is used, an increase in the amount of addition of Cr plays a role in increasing the hardness of a diffusion layer and enhancing strength and, therefore, the amount of addition of Cr may be adjusted in accordance with the intended purpose of the Cu thin sheet. However, if the amount of addition of Cr is more than 30 percent by weight, the Vickers hardness Hv of the Ni—Cr alloy after fixation may become more than 800 and, thereby, the buildup layer may become too hard and become a starting point of cracking during cooling after melting. Therefore, the amount of addition of Cr is preferably 30 percent by weight or less.

In the first method for treating a Cu thin sheet according to the present invention, as described in the item (b), a carbide base metal compound, a nitride base metal compound, or a boride base metal compound is used as the reinforcing material and the weight ratio of the diffusion bonding aid to the reinforcing material is specified to be 80:20 to 50:50 because the stress relaxation rate of the Cu substrate after the buildup layer is formed is reduced. Meanwhile, use of such a reinforcing material increases the value of Vickers hardness of the buildup layer and improves the abrasion resistance.

In the second method for treating a Cu thin sheet, according to the present invention, as described in the item (b), a stainless steel alloy, a Hastelloy Ni base alloy, or a Stellite Co base alloy is used as the reinforcing material and the weight ratio of the diffusion bonding aid to the reinforcing material is specified to be 50:50 to 1:99 because the stress relaxation rate of the Cu substrate after the buildup layer is formed is reduced. Meanwhile, use of such a reinforcing material forms a compound dispersion phase which contains Ni or Co and which is not corroded easily and, thereby, the corrosion resistance is improved. Meanwhile, use of such a reinforcing material forms a compound dispersion phase which contains Ni or Co and which is not corroded easily and, thereby, the corrosion resistance is improved.

In the third method for treating a Cu thin sheet according to the present invention, as described in the item (b), Zr—Cu—Al—Ni Zr base alloy is used as the reinforcing material and the weight ratio of the diffusion bonding aid to the reinforcing material is specified to be 50:50 to 5:95 because the stress relaxation rate of the Cu substrate after the buildup layer is formed is reduced. Meanwhile, use of such a reinforcing material locally discretely forms a high-strength metal glass alloy (amorphous alloy) or any one of the individual elements forms a high-strength alloy phase, compound phase, or the like with a constituent element of the Cu thin sheet or the Ni or Ni—Cr alloy diffusion bonding aid easily even when not becoming amorphous and, thereby, the mechanical characteristics are improved.

In the first to third methods for treating a Cu thin sheet according to the present invention, as described in the item (c), the median diameter $D_{50}$ of the diffusion bonding aid and the median diameter $D_{50}$ of the above-described reinforcing material are specified to fall within 0.1 to 100 μm because of the following reasons. That is, if the median diameter $D_{50}$ is smaller than 0.1 μm, production is difficult and there is no economy because the yield is reduced significantly when classification is performed. If the median diameter $D_{50}$ is more than 100 μm, a weight difference between particles becomes considerable because of a difference in specific gravity between the diffusion bonding aid and the reinforcing material, and when the slurry is prepared, a state in which particles having large specific gravities sink and small particles float is brought about easily, and it becomes difficult to maintain a homogeneous dispersion state. Preferably, these median diameters $D_{50}$ fall within 0.1 to 20 μm. This is because in the case where the median diameter $D_{50}$ is specified to be 20 μm or less, a homogeneous slurry is prepared easily in spite of a specific gravity difference.

The median diameter $D_{50}$ of the diffusion bonding aid is specified to be larger than the median diameter $D_{50}$ of the reinforcing material because of the following reason. That is, the reinforcing material is basically a high-melting point material as compared with the diffusion bonding aid. Therefore, a relatively low-melting point diffusion bonding aid is melted first, a state in which the reinforcing material is melted or heated to adhere in the resulting melt pool can be brought about and, thereby, homogeneous buildup layer is produced easily.

Furthermore, the distribution ratio $D_{90}/D_{10}$ of the diffusion bonding aid and the distribution ratio $D_{90}/D_{10}$ of the reinforcing material are specified to be 4.0 or less because of the following reasons. That is, if this value is more than 4.0, a difference in height increases when the two powders are placed side by side on a thin sheet, and melting becomes nonuniform easily because a tall particle tends to adsorb heat more easily. In this regard, large particles are melted first by laser irradiation and, in addition, small particles may be scattered to the surroundings before being melted because of an impact resulting from the irradiation. Therefore, melting becomes nonuniform easily from this point of view as well. It is not preferable that the melting becomes nonuniform, because unevenness is generated easily on the surface of the buildup layer after being solidified. Furthermore, cracking occurs easily in quenching and solidification. Consequently, the distribution ratios $D_{90}/D_{10}$ of the individual powders are specified to be 4.0 or less.

In the first to third methods for treating a Cu thin sheet according to the present invention, a slurry is prepared by dispersing the diffusion bonding aid and the reinforcing material into a solvent. Here, the solvent is not specifically limited and, for example, a mixed solvent of an organic solvent and water is mentioned. Examples of organic solvents include alcohol base solvents, e.g., methanol, ethanol, isopropanol, and butanol; glycol base solvents, e.g., ethylene glycol and propylene glycol; ketone base solvents, e.g., acetone and methyl ethyl ketone; ester base solvents, e.g., ethyl acetate and butyl acetate; and cellulose base solvents, e.g., ethyl cellulose, acetyl cellulose, and cellulose acetate. Among them, alcohol base solvents, in particular ethanol and isopropanol, which have relatively mild volatility and which are easy to handle are preferable. The viscosity of the solvent may be determined appropriately in accordance with a method for supplying the slurry to the thin sheet. For example, the viscosity of the solvent may be determined appropriately within the range of 0.01084 poise which is the viscosity of ethanol at 25° C. to 0.5 poise which is the viscosity of common lubricating oil at 20° C. as a guideline. In order to prepare this slurry, it is preferable that a small amount of Ni—Cr base brazing material similar to the weld bonding aid be added as a flux. This is because such a flux plays roles in suppressing oxidation, lowering the melting point of a mixed powder, and bonding mixed powders to each other during drying just before melting. Examples of such fluxes include JIS Z 3265 Nickel brazing filler metals (for example, relatively high-melting point BNi-1). A flux having a small specific gravity floats to the surface during melting, and a residue thereof may remain on the buildup layer surface after solidification. However, this residue does not form an alloy and can be easily physically removed with a brush or a file.

In the first to third methods for treating a Cu thin sheet according to the present invention, such a slurry is supplied to a predetermined portion on the thin sheet. Examples of methods for supplying the slurry include a dispenser method, an electric field jet (ink jet) method, brushing, spraying, and pad printing, and pad printing is preferable.

In the first to third methods for treating a Cu thin sheet according to the present invention, the slurry supplied to the predetermined portion on the thin sheet is dried and, thereafter, a laser is applied to induce melting, solidification, and fixation. The condition of the laser irradiation is not specifically limited. For example, a micro laser may be applied by using a Nd-YAG laser generator with a rated output of 150 W and an optical lens system. In this case, it is preferable that the focal diameter be selected within 100 to 1,000 μm optionally, adjustment to just focus or defocus be performed, and the laser be applied to a region smaller than a solid substance after the slurry is dried. The laser may be a pulse wave and be applied for an output time within the range of 0.5 to 20 milliseconds at a frequency within the range of 0.1 to 50 Hz. The substantial irradiation time may be about 0.1 seconds to 1.0 seconds. Alternatively, the laser may be ruby laser, Y-YAG laser, DPSSL, or the like. In this regard, the frequency of the laser light is not necessarily limited to the frequency corresponding to the common wavelength of Nd-YAG of 1,064 nm, and harmonics may be used. Meanwhile, in the case where the thickness of the thin sheet is 1 nm or less, preferably, a pulse wave is used as the laser. In the case where the thickness is more than 1 mm or in the case where fixation of a large amount of high-melting point reinforcing material is intended, preferably, a continuous wave is used as the laser.

Figure 2:
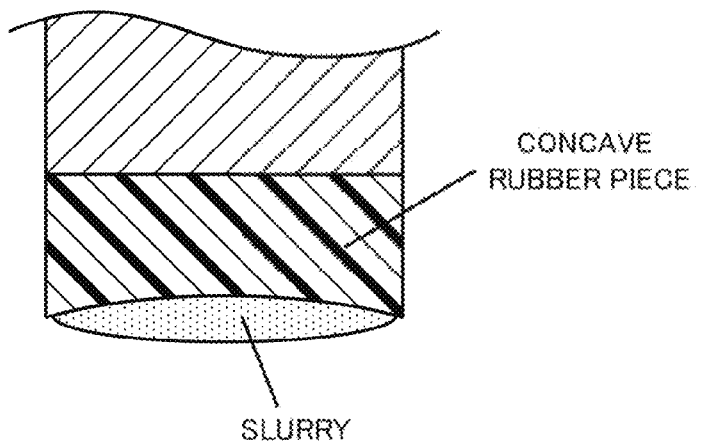
FIG. 2 is an explanatory diagram showing the state in which a slurry has been transferred to a concave rubber piece.

Here, the specific examples of the first to third methods for treating a Cu thin sheet, according to the present invention, will be described below with reference to FIG. 1. In FIG. 1, the pad printing is adopted as the method for supplying the slurry. Initially, a slurry 10 is prepared, and the slurry 10 is put into a shallow hard container 12 (refer to FIG. 1(a)). A state in which ultrasonic vibration is applied to the hard container 12 is brought about, and the slurry 10 is temporarily transferred to a transfer pad 14 in which a rubber piece 14a made from an elastic material is attached to the end of a pressing rod 14b (refer to FIG. 1(b)). The rubber piece 14a may be made from, for example, silicone rubber. Subsequently, the transfer pad 14 is allowed to come down, the slurry 10 transferred to the rubber piece 14a is pressed against a predetermined portion on a Cu thin sheet 16 and is attached thereto (refer to FIG. 1(c)). After the slurry 10 was attached to the Cu thin sheet 16, the transfer pad 14 is allowed to come up. An excess slurry 10 is brought back by the rubber piece 14a and a thin slurry layer 11 is formed on the predetermined portion of the Cu thin sheet 16 (refer to FIG. 1(d)). This slurry layer 11 has a clear boundary portion. It is difficult to measure the thickness of this slurry layer 11, although the height after the powder is melted and solidified is considered to be about one-half of the thickness of this slurry layer 11. The degree of deformation of the rubber piece 14a of the transfer pad 14 is changed by the magnitude of the pressure. Therefore, the size of the printing region can be controlled by the pressure. Meanwhile, the rubber piece 14a may have a concave end. In that case, a relatively thick slurry layer is formed. FIG. 2 shows the state in which the slurry has been transferred to such a concave rubber piece. After the slurry layer 11 is formed on the Cu thin sheet 16, the slurry layer 11 is dried and, then, a laser is applied (refer to FIG. 1(e)). As a result, the powder in the slurry is melted and solidified, so that the buildup layer 18 is formed (refer to FIG. 1(f)). This buildup layer 18 diffuses into the Cu thin sheet 16, and the interface is fused sufficiently.

In the first to third methods for treating a Cu thin sheet according to the present invention, a continuous tape-shaped thin sheet having a thickness of 1 mm or less may be used. In this case, it is also possible that one side of the tape-shaped thin sheet is perforated with pilot holes successively along the longitudinal direction by a press or the like, automatic carrying is performed at a pilot hole pitch interval, the slurry transferred to the transfer pad is attached to a predetermined specific region (predetermined portion) when the specific region faces the transfer pad, the attached slurry was dried and, thereafter, the laser is applied to induce melting, solidification, and fixation and, thereby, form a buildup layer continuously.

According to the first to third methods for treating a Cu thin sheet of the present invention, the buildup layer is formed in the predetermined portion on the thin sheet. In this buildup layer, at least a part is diffused into the thin sheet. Meanwhile, in the buildup layer, a partly unmelted reinforcing material may be dispersed, a intermetallic compound may be included, and a phase having an amorphous structure resulting from quenching and solidification may be contained. In this regard, the intermetallic compound appears as a sharp peak when the X-ray diffraction intensity of the buildup layer is examined while the diffraction angle $2\theta$ is changed. Also, the presence of the phase having an amorphous structure can be identified by a broad pattern (halo pattern) which appears when the X-ray diffraction intensity of the buildup layer is examined while the diffraction angle $2\theta$ is changed in the same manner. The stress relaxation rate is reduced by formation of such a buildup layer in the predetermined portion on the thin sheet. In addition, a local improvement in strength, an improvement in thermal endurance, an improvement in corrosion resistance•abrasion resistance, and the like are facilitated in accordance with the properties of the reinforcing material. Consequently, for example, new characteristics required of a thin sheet for an electric contact can be added without changing the material characteristics intrinsic to Cu and Cu base alloy.

EXAMPLES

Example 1

1. Treatment Procedure of Cu Base Material

Figure 3:
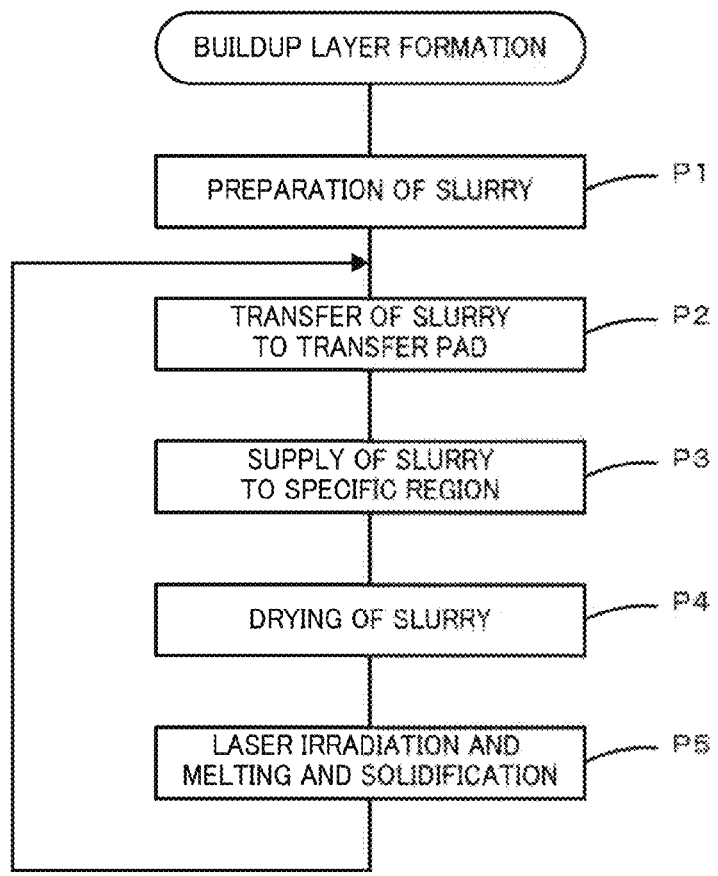
FIG. 3 is a flow chart showing an experiment procedure in Example 1.

FIG. 3 shows a flow of a specific experiment procedure. The procedure will be described below following the flow.

(1) Preparation of Slurry (P1)

A Cu-1.8Be-0.2Co alloy (percent by mass) base material was prepared by cutting into the shape of a tape having a thickness of 0.20 mm, a width of 23 mm, and a length of 2,000 mm. Also, a Ni—Cr alloy powder of 80 percent by weight Ni-20 percent by weight Cr serving as the diffusion bonding aid and a carbide base metal compound powder of 90 percent by weight WC-10 percent by weight Co serving as the reinforcing material were prepared. The Ni—Cr alloy powder was spherical, the median diameter $D_{50}$ was 40 (μm), and the distribution ratio $D_{90}/D_{10}$ was 1.6. The carbide base metal compound powder was spherical, the median diameter $D_{50}$ was 20 (μm), and the distribution ratio $D_{90}/D_{10}$ was 1.7. In this regard, such characteristics of the base material, the diffusion bonding aid, and the reinforcing material are summarized in Table 1. Here, in the particle diameter distribution of a powder, when the number or a total mass of particles having particle diameters larger than some particle diameter is 50% of that of the whole powder, the some particle diameter is referred to as the median diameter $D_{50}$, as specified in JIS Z8901. Meanwhile, in the particle diameter distribution of a powder, the value obtained by dividing the particle diameter $D_{90}$ by the particle diameter $D_{10}$ is referred to as a distribution ratio $D_{90}/D_{10}$, where when the number or a total mass of particles having particle diameters less than some particle diameter is 90% of that of the whole powder, the some particle diameter is referred to as the particle diameter $D_{90}$, and when the number or a total mass of particles having particle diameters less than some particle diameter is 10% of that of the whole powder, the some particle diameter is referred to as the particle diameter $D_{10}$. The particle size was measured with Nano Particle Size Distribution Analyzer SALD-7100 produced by SHIMADZU CORPORATION by using a laser diffraction•scattering method. Subsequently, the diffusion bonding aid and the reinforcing material were mixed in a ceramic dish container at a ratio of 80:20 on a weight ratio basis until homogeneity is ensured. A very small amount of high-temperature brazing material corresponding to a commercially available JIS Z 3265 Nickel brazing filler metal, BNi-1, was added thereto as a sintering aid, and dilution was performed by adding 10 mL of an ethanol aqueous solution (ethanol:distilled water=95:5 (v/v)) per gram of mixed powder to produce a slurry.

(2) Transfer of Slurry to Transfer Pad (P2)

A fine silicone resin transfer pad having a convexly arced end is dipped into the slurry in the container so as to transfer the slurry to the surface.

(3) Supply of Slurry to Specific Region (P3)

The slurry transferred to the transfer pad was pressed against a predetermined specific region on the base material, so as to attach and fix the solution to take on the shape of a circle having a diameter of 1.5 mm (1,500 μm).

(4) Drying of Slurry (P4)

The slurry attached to the specific region was air-dried.

(5) Laser Irradiation and Melting and Solidification (P5)

The YAG laser having a focal diameter of about 100 μm was applied to the fixated material after drying by using a TL-150S laser irradiation apparatus produced by Techno-Coat Company, Limited at 10 milliseconds and 10 Hz pulse. In this manner, a buildup layer having a thickness of 100 μm and a diameter of 1.5 mm was formed. It can be said that the portion provided with this buildup layer was locally clad. A buildup layer can be formed on the next specific region by repeating P2 to P5 again thereafter. In this regard, the buildup layer formation conditions are summarized in Table 2.

2. Properties of Locally Clad Base Material

The following items (1) to (6) were measured in the state after the buildup layers were solidified. The items (7) to (9) were measured after the buildup layers were solidified and subjected to an aging treatment. The individual measurement results are shown in Table 3. In this regard, the aging treatment was executed by holding at 315° C. for 2 hours in the inside of an electric furnace substituted with an inert nitrogen gas and, thereafter, performing standing to cool.

(1) Typical Thickness of Buildup Layer

The typical thickness of the buildup layer was specified to be a maximum thickness among thicknesses obtained by measuring the thickness, which includes the base material, of the whole specific region provided with the buildup layer by using a micrometer.

(2) Arithmetic Mean Roughness Ra

A confocal red semiconductor laser profilometer LT-9010M by KEYENCE CORPORATION was used, the shape profile of the buildup layer surface was drawn at a distance of 2 mm, an arithmetic mean roughness Ra was determined in conformity with the definition of the surface roughness in JIS B 0601-1994, and this was specified to be an index of the surface smoothness.

(3) Appearance State

The appearance state was evaluated visually and by using a stereomicroscope capable of observing at a magnification of 30 times on the basis of presence or absence of cracks and irregularities of the surface.

(4) Interfacial State

The interface between the composite layer and the base material was embedded into a resin for observation while the orientation is adjusted in such a way that the thickness direction of the base material is observed from the surface, polishing was performed with a mechanical polishing machine up to the inside suitable for observing the interface, and whether fusion has occurred or not was examined and evaluated under an optical microscope with a magnification of about 30 to 100.

(5) Vickers Hardness

An appropriate size of test piece including the buildup layer was cut from the thin sheet, and the Vickers hardness of the composite layer surface was measured in conformity with JIS Z2244 (Vickers hardness-Test method) by using Micro Vickers Hardness Testing Machine HM-15 produced by Mitutoyo Corporation.

(6) Examination of Presence of Compound/Amorphous Substance

As for whether a compound was present in the composite layer or not or an amorphous substance was present or not, the state of diffraction line of Cu-Kα line obtained by applying an X-ray diffractometer to the buildup layer of the base material was observed and the crystallinity of the buildup layer was determined.

(7) Tensile Test

A tensile test piece including the buildup layer was cut from the thin sheet, and a tensile test was performed at ambient temperature in conformity with JIS Z2241 (Metallic materials tensile testing method) by using Autograph AG-IS produced by SHIMADZU CORPORATION.

(8) Electrical Conductivity

A test piece including the buildup layer and having a width of 10 mm and a length of 150 mm was cut from the thin sheet, an electrical resistance was measured at ambient temperature by a four terminal method using a precise double bridge apparatus 2572 produced by Yokogawa Electric Corporation. The ratio of the measured electrical resistivity was calculated, where the electrical conductivity of a standard annealed copper having an electrical resistance of 1.7241 μΩcm at 20° C. was specified to be 100%, and was specified as the electrical conductivity (% IACS: International Annealed Copper Standard).

(9) Stress Relaxation Resistance

Figure 4:
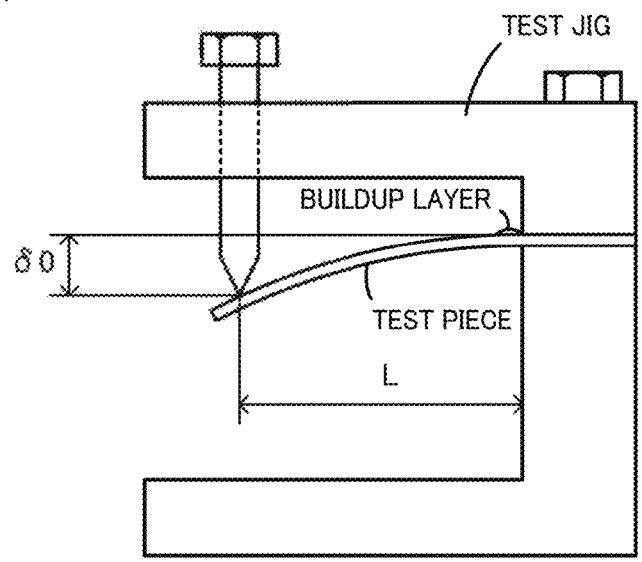
FIG. 4 is an explanatory diagram of a test jig used for measuring a stress relaxation rate.
Figure 4:
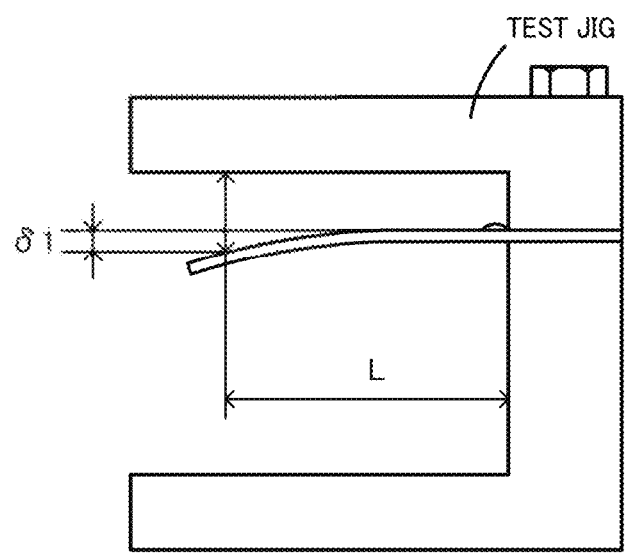

A test piece having a width of 10 mm and a length of 23 mm was cut from the thin sheet in such a way as to include the buildup layer and, as shown in FIG. 4, the stress relaxation rate was measured by a cantilever method described in Electronic Materials Manufacturers Association of Japan Standard EMAS-3003 (December 1991). That is, the test piece was set into a test jig in such a way that a span length L was 10 mm and the buildup layer served as a fulcrum, a stress of 600 MPa was applied to the test piece to deform, and the amount of deformation ($\delta_0$) at that time was measured (refer to FIG. 4(a)). Subsequently, after 100 hours were elapsed in a drying furnace at 200° C. while that state was maintained, the stress was removed, and the amount of deformation ($\delta_t$) of the test piece was measured again (refer to FIG. 4(a)). Then, the stress relaxation rate ($=(\delta_t/\delta_0) \times 100\%$) was calculated using the amounts of deformation $\delta_0$ and $\delta_t$. In this regard, in FIG. 4, the test piece was set in such a way that the buildup layer was located on the upper surface and the stress was applied from the upper surface side. However, the effect thereof is not changed in the case where the test piece is turned over, that is, turned 180°, and is set in such a way that the buildup layer is located on the lower surface of the test piece. Furthermore, the effect thereof is not changed in the case where a test piece cut having a width of 2 mm and the length of 23 mm is used and is set in such a way that the buildup layer is located on any one of the side surfaces, that is, the test piece is set in the orientation turned 90° C. from that shown in FIG. 4(a).

Examples 2 to 18, Comparative Examples 1 to 13

Base materials, diffusion bonding aids, and reinforcing materials shown in Table 1 were used, buildup layer forming conditions shown in Table 2 were adopted, and Cu base materials were treated in conformity with the item "1. Treatment procedure of Cu base material". Various parameters of the treated Cu base materials were measured in the same manner as the items (1) to (9) of "2. Properties of locally clad base material" in Example 1. The results thereof are shown in Table 3.

Figure 5:
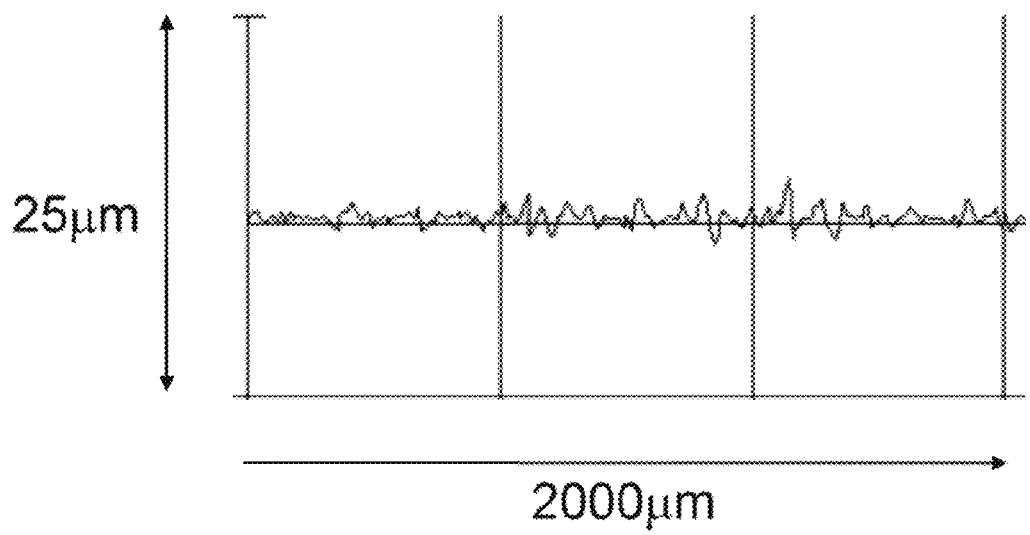
FIG. 5 is a shape profile of a buildup layer surface with smooth unevenness.
Figure 6:
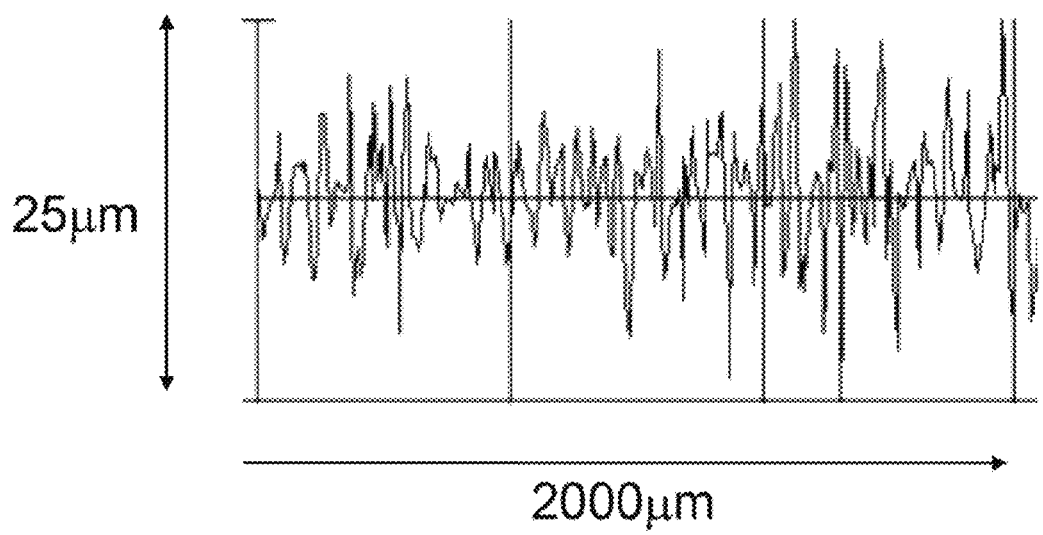
FIG. 6 is a shape profile of a buildup layer surface with considerable unevenness.
Figure 7:
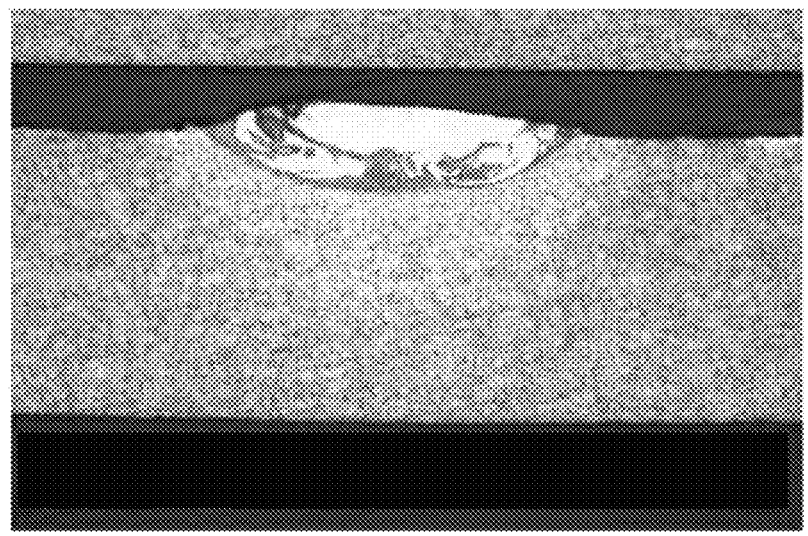
FIG. 7 is a cross-sectional photograph of a good interface.
Figure 8:
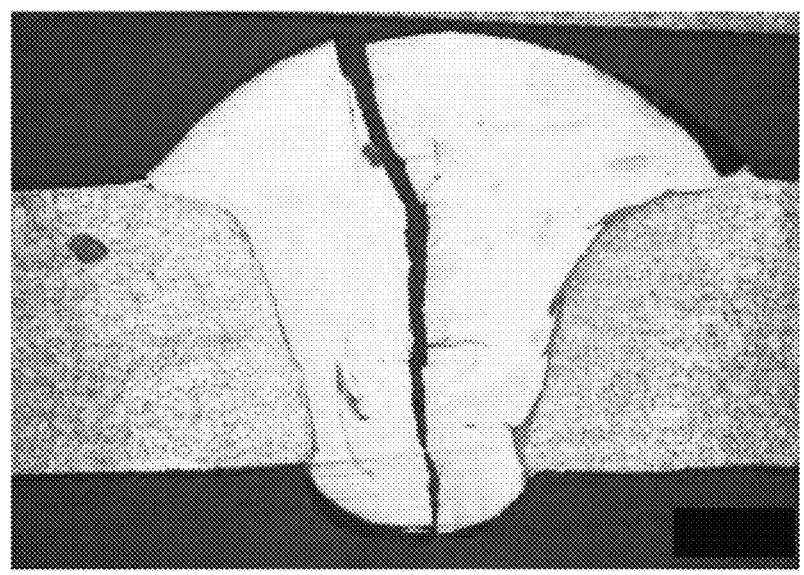
FIG. 8 is a cross-sectional photograph of a defective interface.
Figure 9:
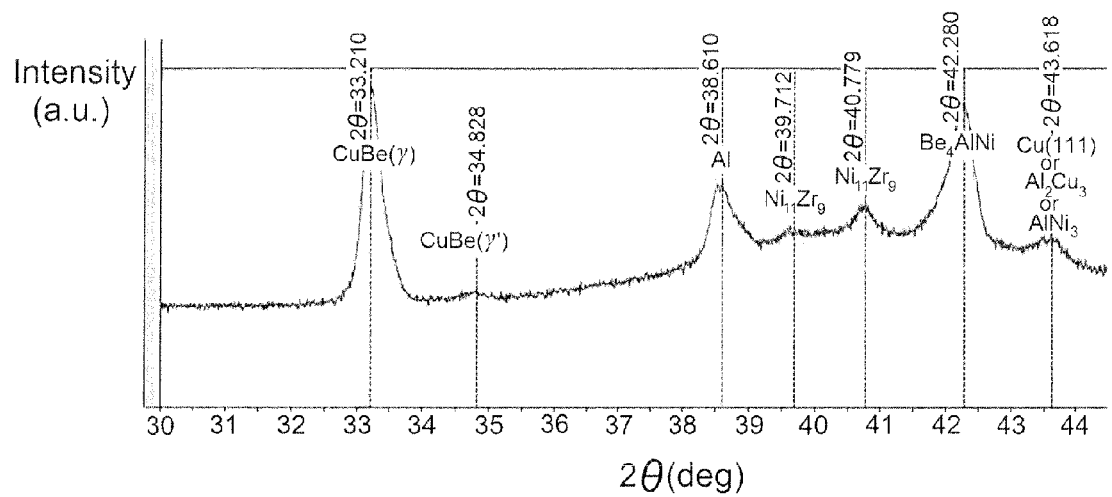
FIG. 9 is a graph of diffraction line of Cu-Kα line of a buildup layer in which an intermetallic compound is present.
Figure 10:
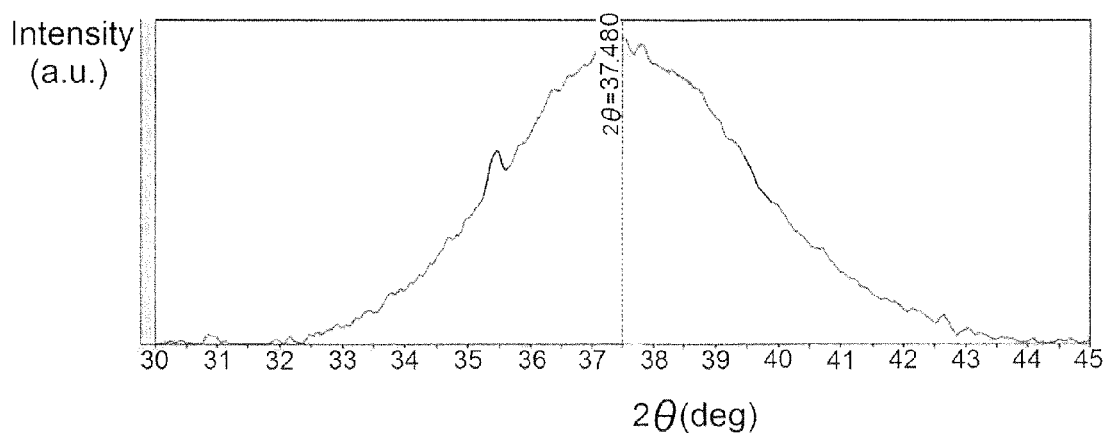
FIG. 10 is a graph of diffraction line of Cu-Kα line of a buildup layer in which an amorphous phase is present.

In this regard, examples of surface shape profiles attained in the measurement of the arithmetic mean roughness Ra are shown in FIG. 5 and FIG. 6. FIG. 5 shows the shape profile in Example 12, and FIG. 6 shows the shape profile in Comparative Example 3. Meanwhile, examples of the results of interface observation are shown in FIG. 7 and FIG. 8. FIG. 7 is a cross-sectional photograph of Example 12. In this example, cracks and the like are not present and the state of fusion is good. FIG. 8 is a cross-sectional photograph of a defective buildup layer. In this example, fusion is observed partly, but there is a large crack. In addition, examples of diffraction lines of Cu-Kα line are shown in FIG. 9 and FIG. 10. FIG. 9 shows one of diffraction charts in Example 12 and a plurality of sharp peaks are observed. They indicate that intermetallic compounds are present in the buildup layer. FIG. 10 shows one of diffraction charts in Example 14 and a broad peak is observed. This indicates that an amorphous phase is present in part of the buildup layer.

In Examples 1 to 18, a Ni powder or a Ni—Cr alloy powder containing 80 percent by weight of Ni and 20 percent by weight of Cr was used as the diffusion bonding aid. In this regard, the median diameter $D_{50}$ of the diffusion bonding aid and the median diameter $D_{50}$ of the reinforcing material fell within 0.1 to 100 μm, the median diameter $D_{50}$ of the diffusion bonding aid was larger than the median diameter $D_{50}$ of the reinforcing material, and both the distribution ratio $D_{90}/D_{10}$ of the diffusion bonding aid and the distribution ratio $D_{90}/D_{10}$ of the above-described reinforcing material were 4.0 or less. In addition, in the case where the reinforcing material was a carbide base metal compound or a boride base metal compound, the weight ratio of the diffusion bonding aid to the reinforcing material was specified to be 80:20 to 50:50 (Examples 1 to 6). In the case of a hastelloy Ni base alloy or a stellite Co base alloy, the weight ratio of the diffusion bonding aid to the reinforcing material was specified to be 50:50 to 1:99 (Examples 7 to 10), and in the case of a Zr—Cu—Al—Ni Zr base alloy, the weight ratio of the diffusion bonding aid to the reinforcing material was specified to be 50:50 to 5:95 (Examples 11 to 18). As a result, the stress relaxation rate was able to be reduced by 10% or more without changing the material characteristics of the base material as compared with those in Comparative Examples 1 and 2 in which the base material was used alone.

On the other hand, in Comparative Examples 1 and 2, the tensile strength, the electrical conductivity, and the stress relaxation rate of the base material in itself were measured. The tensile strength and the electrical conductivity were equivalent to those in Examples 1 to 18, although values of the stress relaxation rate were more than 30%.

In Comparative Examples 3 and 4, a carbide base metal compound or a boride base metal compound was used as the reinforcing material. The weight ratio of the diffusion bonding aid to the reinforcing material was out of 80:20 to 50:50 and, therefore, cracks and variations were observed in the appearance state of the buildup layer, and the fusion state of the interface was also insufficient.

In Comparative Examples 5 and 6, a Hastelloy Ni base alloy or a Stellite Co base alloy was used as the reinforcing material. The weight ratio of the diffusion bonding aid to the reinforcing material was out of 50:50 to 1:99 and, therefore, cracks and variations were observed in the appearance state of the buildup layer, and the fusion state of the interface was insufficient in some cases.

In Comparative Example 7, the distribution ratio $D_{90}/D_{10}$ of the diffusion bonding aid and the distribution ratio $D_{90}/D_{10}$ of the reinforcing material were more than 4.0 and, therefore, the typical thickness was large, the surface roughness was rough, and cracks were observed in the appearance state of the buildup layer. Also, in Comparative Example 8, the median diameter $D_{50}$ of the diffusion bonding aid and the median diameter $D_{50}$ of the reinforcing material were more than 100 μm and, therefore, the typical thickness was large, the surface roughness was rough, and cracks were observed in the appearance state of the buildup layer. Also, in Comparative Example 9, the median diameter $D_{50}$ of the diffusion bonding aid was smaller than the median diameter $D_{50}$ of the reinforcing material and, therefore, the typical thickness was large, the surface roughness was rough, and cracks were observed in the appearance state of the buildup layer.

In Comparative Examples 10 and 11, a 55Zr-30Cu-10Al-5Ni alloy was used as the reinforcing material. The weight ratio of the diffusion bonding aid to the reinforcing material was out of 50:50 to 5:95 and, therefore, variations were observed in the appearance state of the buildup layer and the effect of reducing the stress relaxation rate was not sufficient.

In Comparative Examples 12 and 13, the diffusion bonding aid and the reinforcing material were supplied in the state of powder instead of slurry and, therefore, variations were observed in the appearance state of the buildup layer, and the interface was in the state of not fused. Also, the effect of reducing the stress relaxation rate was not exerted to a great extent.

TABLE 1

| | | Base Material | | Diffusion Bonding Aid | | | Reinforcing Material | | | |
|---|---|---|---|---|---|---|---|---|---|---|
| | | Composition mass % | Thickness mm | Composition mass % | Median Diameter $D_{50}$/μm | Distribution Ratio $D_{90}/D_{10}$ | Composition mass % | (Name) | Median Diameter $D_{50}$/μm | Distribution Ratio $D_{90}/D_{10}$ |
| Example | 1 | Cu—1.8Be—0.2Co | 0.20 | Ni—20Cr | 40 | 1.6 | WC—10Co | Cermet | 20 | 1.7 |
| | 2 | Cu—1.8Be—0.2Co | 0.20 | Ni—20Cr | 40 | 1.6 | WC—10Co | Cermet | 20 | 1.7 |
| | 3 | Cu—1.8Be—0.2Co | 0.20 | Ni | 40 | 1.6 | TiC—30Co | Cermet | 30 | 1.9 |
| | 4 | Cu—1.8Be—0.2Co | 0.20 | Ni | 40 | 1.6 | TiC—30Co | Cermet | 30 | 1.9 |
| | 5 | Cu—1.8Be—0.2Co | 0.20 | Ni | 40 | 1.6 | $Cr_2C_4$—20Mo | Cermet | 20 | 1.7 |
| | 6 | Cu—1.8Be—0.2Co | 0.20 | Ni | 40 | 1.6 | $TiB_2$—30Co | Cermet | 20 | 2.3 |
| | 7 | Cu—1.8Be—0.2Co | 0.20 | Ni | 40 | 1.6 | Ni—15Cr—5Mo | Hastelloy | 10 | 1.6 |
| | 8 | Cu—1.8Be—0.2Co | 0.20 | Ni | 40 | 1.6 | Ni—15Cr—5Mo | Hastelloy | 10 | 1.6 |
| | 9 | Cu—1.8Be—0.2Co | 0.32 | Ni | 40 | 1.6 | Co—28Cr—4W | Stellite | 20 | 1.9 |
| | 10 | Cu—1.8Be—0.2Co | 0.20 | Ni | 40 | 1.6 | Co—28Cr—4W | Stellite | 20 | 1.9 |
| | 11 | Cu—1.8Be—0.2Co | 0.20 | Ni—20Cr | 77 | 2.2 | 55Zr—30Cu—10Al—5Ni | Metal Glass | 60 | 3.3 |
| | 12 | Cu—1.8Be—0.2Co | 0.20 | Ni—20Cr | 30 | 1.8 | 55Zr—30Cu—10Al—5Ni | Metal Glass | 0.6 | 3.8 |
| | 13 | Cu—1.8Be—0.2Co | 0.20 | Ni—20Cr | 97 | 3.9 | 55Zr—30Cu—10Al—5Ni | Metal Glass | 80 | 3.9 |
| | 14 | Cu—1.8Be—0.2Co | 0.20 | Ni | 20 | 1.7 | 55Zr—30Cu—10Al—5Ni | Metal Glass | 0.6 | 3.8 |
| | 15 | Cu—2.8Ni—0.6Si | 0.20 | Ni—20Cr | 77 | 2.2 | 55Zr—30Cu—10Al—5Ni | Metal Glass | 60 | 3.3 |
| | 16 | Cu—1.8Be—0.2Co | 0.85 | Ni—20Cr | 97 | 3.9 | 55Zr—30Cu—10Al—5Ni | Metal Glass | 80 | 3.9 |
| | 17 | Cu—1.8Be—0.2Co | 0.20 | Ni—20Cr | 77 | 2.2 | 55Zr—30Cu—10Al—5Ni | Metal Glass | 60 | 3.3 |
| | 18 | Cu—1.8Be—0.2Co | 0.20 | Ni—20Cr | 77 | 2.2 | 55Zr—30Cu—10Al—5Ni | Metal Glass | 60 | 3.3 |
| Comparative Example | 1 | Cu—1.8Be—0.2Co | 0.20 | — | — | — | — | — | — | — |
| | 2 | Cu—2.8Ni—0.6Si | 0.20 | — | — | — | — | — | — | — |
| | 3 | Cu—1.8Be—0.2Co | 0.20 | Ni—20Cr | 95 | 3.8 | WC—10Co | Cermet | 80 | 3.9 |
| | 4 | Cu—1.8Be—0.2Co | 0.20 | Ni—20Cr | 95 | 3.8 | WC—10Co | Cermet | 80 | 3.9 |
| | 5 | Cu—1.8Be—0.2Co | 0.20 | — | — | — | Ni—15Cr—5Mo | Hastelloy | 80 | 3.9 |
| | 6 | Cu—1.8Be—0.2Co | 0.20 | Ni—20Cr | 95 | 3.8 | Ni—15Cr—5Mo | Hastelloy | 80 | 3.9 |

TABLE 1-continued

| | | Base Material | | Diffusion Bonding Aid | | | Reinforcing Material | | | |
|---|---|---|---|---|---|---|---|---|---|---|
| | | Composition mass % | Thickness mm | Composition mass % | Median Diameter $D_{50}$/μm | Distribution Ratio $D_{90}/D_{10}$ | Composition mass % | (Name) | Median Diameter $D_{50}$/μm | Distribution Ratio $D_{90}/D_{10}$ |
| | 7 | Cu—1.8Be—0.2Co | 0.20 | Ni—20Cr | 97 | 4.4 | 55Zr—30Cu—10Al—5Ni | Metal Glass | 90 | 4.1 |
| | 8 | Cu—1.8Be—0.2Co | 0.20 | Ni—20Cr | 108 | 3.8 | 55Zr—30Cu—10Al—5Ni | Metal Glass | 102 | 3.9 |
| | 9 | Cu—1.8Be—0.2Co | 0.20 | Ni—20Cr | 77 | 2.2 | 55Zr—30Cu—10Al—5Ni | Metal Glass | 110 | 3.9 |
| | 10 | Cu—1.8Be—0.2Co | 0.20 | Ni—20Cr | 77 | 2.2 | 55Zr—30Cu—10Al—5Ni | Metal Glass | 60 | 3.3 |
| | 11 | Cu—1.8Be—0.2Co | 0.20 | Ni—20Cr | 77 | 2.2 | 55Zr—30Cu—10Al—5Ni | Metal Glass | 60 | 3.3 |
| | 12 | Cu—1.8Be—0.2Co | 0.20 | Ni—20Cr | 77 | 2.2 | 55Zr—30Cu—10Al—5Ni | Metal Glass | 60 | 3.3 |
| | 13 | Cu—1.8Be—0.2Co | 0.20 | Ni—20Cr | 77 | 2.2 | 55Zr—30Cu—10Al—5Ni | Metal Glass | 60 | 3.3 |

TABLE 2

| | | Buildup Layer Formation Conditions | | | | |
|---|---|---|---|---|---|---|
| | | Mixing Ratio Auxiliary Agent:Reinforcing Agent | Supply Method | Diluting Fluid | Form | Beam Diameter μm |
| Example | 1 | 80:20 | Pad Printing | Water + Ethanol | Slurry | 100 |
| | 2 | 50:50 | Pad Printing | Water + Ethanol | Slurry | 100 |
| | 3 | 80:20 | Pad Printing | Water + Ethanol | Slurry | 100 |
| | 4 | 50:50 | Pad Printing | Water + Ethanol | Slurry | 100 |
| | 5 | 80:20 | Pad Printing | Water + Ethanol | Slurry | 100 |
| | 6 | 30:70 | Pad Printing | Water + Ethanol | Slurry | 100 |
| | 7 | 1:99 | Pad Printing | Water + Ethanol | Slurry | 100 |
| | 8 | 50:50 | Pad Printing | Water + Ethanol | Slurry | 100 |
| | 9 | 1:99 | Pad Printing | Water + Ethanol | Slurry | 100 |
| | 10 | 1:99 | Pad Printing | Water + Ethanol | Slurry | 100 |
| | 11 | 10:90 | Pad Printing | Water + Ethanol | Slurry | 100 |
| | 12 | 10:90 | Pad Printing | Water + Ethanol | Slurry | 100 |
| | 13 | 10:90 | Pad Printing | Water + Ethanol | Slurry | 100 |
| | 14 | 5:95 | Pad Printing | Water + Ethanol | Slurry | 100 |
| | 15 | 10:90 | Pad Printing | Water + Ethanol | Slurry | 100 |
| | 16 | 5:95 | Pad Printing | Water + Ethanol | Slurry | 100 |
| | 17 | 20:80 | Pad Printing | Water + Ethanol | Slurry | 100 |
| | 18 | 50:50 | Pad Printing | Water + Ethanol | Slurry | 100 |
| Comparative Example | 1 | — | — | — | — | — |
| | 2 | — | — | — | — | — |
| | 3 | 45:55 | Pad Printing | Water + Ethanol | Slurry | 100 |
| | 4 | 90:10 | Pad Printing | Water + Ethanol | Slurry | 100 |
| | 5 | 0:100 | Pad Printing | Water + Ethanol | Slurry | 100 |
| | 6 | 55:45 | Pad Printing | Water + Ethanol | Slurry | 100 |
| | 7 | 20:80 | Pad Printing | Water + Ethanol | Slurry | 100 |
| | 8 | 20:80 | Pad Printing | Water + Ethanol | Slurry | 100 |
| | 9 | 20:80 | Pad Printing | Water + Ethanol | Slurry | 100 |
| | 10 | 0:100 | Pad Printing | Water + Ethanol | Slurry | 100 |
| | 11 | 55:45 | Pad Printing | Water + Ethanol | Slurry | 100 |
| | 12 | 10:90 | Mending Tape | None | Powder | 100 |
| | 13 | 10:90 | Adhesive | None | Powder | 100 |

TABLE 3

| | | State After Solidification | | | | | | Properties After Solidification and Subsequent Aging Treatment | | |
|---|---|---|---|---|---|---|---|---|---|---|
| | | Typical Thickness mm | Surface Roughness Ra mm | Appearance State | Interface State | Vickers Hardness MHv | Presence of Compound | Presence of Amorphous Substance | Tensile Strength N/mm$^2$ | Electrical Conductivity % IACS | Stress Relaxation Resistance % |
| Example | 1 | 0.05 | 0.28 | Good | Fused | 720 | Present | — | 1381 | 23 | 13 |
| | 2 | 0.09 | 0.28 | Good | Fused | 725 | Present | — | 1382 | 23 | 12 |
| | 3 | 0.06 | 0.25 | Good | Fused | 788 | Present | — | 1380 | 23 | 13 |
| | 4 | 0.08 | 0.29 | Good | Fused | 790 | Present | — | 1380 | 23 | 14 |

TABLE 3-continued

|  |  | State After Solidification | | | | | | | Properties After Solidification and Subsequent Aging Treatment | | |
|---|---|---|---|---|---|---|---|---|---|---|---|
|  |  | Typical Thickness mm | Surface Roughness Ra mm | Appearance State | Interface State | Vickers Hardness MHv | Presence of Compound | Presence of Amorphous Substance | Tensile Strength N/mm² | Electrical Conductivity % IACS | Stress Relaxation Resistance % |
|  | 5 | 0.04 | 0.27 | Good | Fused | 770 | Present | — | 1377 | 23 | 12 |
|  | 6 | 0.06 | 0.31 | Good | Fused | 730 | Present | — | 1394 | 23 | 12 |
|  | 7 | 0.05 | 0.29 | Good | Fused | 510 | Present | — | 1377 | 23 | 12 |
|  | 8 | 0.08 | 0.27 | Good | Fused | 505 | Present | — | 1378 | 23 | 13 |
|  | 9 | 0.06 | 0.29 | Good | Fused | 550 | Present | — | 1377 | 23 | 13 |
|  | 10 | 0.07 | 0.29 | Good | Fused | " | Present | — | 1383 | 23 | 13 |
|  | 11 | 0.09 | 0.31 | Good | Fused | 310 | Present | Present | 1380 | 23 | 14 |
|  | 12 | 0.05 | 0.29 | Good | Fused | 310 | Present | Present | 1375 | 23 | 15 |
|  | 13 | 0.11 | 0.35 | Good | Fused | 310 | Present | Present | 1383 | 23 | 17 |
|  | 14 | 0.03 | 0.30 | Good | Fused | 310 | Present | Present | 1385 | 23 | 12 |
|  | 15 | 0.08 | 0.31 | Good | Fused | 310 | Present | Present | 788 | 38 | 19 |
|  | 16 | 0.15 | 0.40 | Good | Fused | 325 | Present | Present | 1381 | 23 | 19 |
|  | 17 | 0.12 | 0.33 | Good | Fused | 313 | Present | Present | 1379 | 23 | 15 |
|  | 18 | 0.09 | 0.28 | Good | Fused | 310 | Present | Present | 1383 | 23 | 15 |
| Comparative Example | 1 | — | 0.13 | — | — | — | — | — | 1383 | 23 | 31 |
|  | 2 | — | 0.14 | — | — | — | — | — | 795 | 38 | 35 |
|  | 3 | 0.33 | 1.09 | Crack | Insufficient | 880 | Present | — | Not Evaluated | Not Evaluated | Not Evaluated |
|  | 4 | 0.02 | 0.89 | Variation | Insufficient | 477 | Present | — | Not Evaluated | Not Evaluated | Not Evaluated |
|  | 5 | 0.56 | 1.98 | Crack | Insufficient | 824 | Present | — | Not Evaluated | Not Evaluated | Not Evaluated |
|  | 6 | 0.44 | 1.12 | Variation | Fused | 388 | Present | — | Not Evaluated | Not Evaluated | Not Evaluated |
|  | 7 | 0.23 | 0.74 | Crack | Fused | 310 | Present | Present | 1380 | 23 | Not Evaluated |
|  | 8 | 0.37 | 1.61 | Crack | Fused | " | Present | Present | 1377 | 23 | Not Evaluated |
|  | 9 | 0.38 | 1.77 | Crack | Fused | " | Present | Present | 1388 | 23 | Not Evaluated |
|  | 10 | 0.2 | 0.51 | Variation | Fused | " | Present | Present | 1379 | 23 | Not Evaluated |
|  | 11 | 0.15 | 0.33 | Variation | Fused | " | Present | Present | 1390 | 23 | 22 |
|  | 12 | 0.01 | 0.4 | Variation | Not Fused | " | Present | Present | 1378 | 23 | 26 |
|  | 13 | 0.01 | 0.33 | Variation | Not Fused | " | Present | Present | 1378 | 23 | 28 |

The present application claims priority from Japanese Patent Application No. 2011-066597 filed on Mar. 24, 2011, the entire contents of which are incorporated herein by reference.

INDUSTRIAL APPLICABILITY

The present invention can be utilized for Cu thin sheets used as electrical contact materials, e.g., motor brushes.

What is claimed is:
1. A method for treating a Cu thin sheet, comprising the steps of:
   supplying a slurry in which a diffusion bonding aid and a reinforcing material are dispersed in a solvent to a predetermined portion on a Cu or Cu base alloy thin sheet, drying the supplied slurry, and applying a laser to induce melting, solidification, and fixation, so as to form a buildup layer,
   wherein (a) a Ni or Ni—Cr alloy powder is used as the diffusion bonding aid,
   (b) a carbide base metal compound, a nitride base metal compound, or a boride base metal compound is used as the reinforcing material, and the weight ratio of the diffusion bonding aid to the reinforcing material is specified to be 80:20 to 50:50, and
   (c) the median diameters $D_{50}$ of both the diffusion bonding aid and the reinforcing material fall within 0.1 to 100 μm, the median diameter $D_{50}$ of the diffusion bonding aid is larger than the median diameter $D_{50}$ of the reinforcing material, the distribution ratio $D_{90}/D_{10}$ of the diffusion bonding aid is 1.8 or less, and the distribution ratio $D_{90}/D_{10}$ of the reinforcing material is 4.0 or less.
2. The method for treating a Cu thin sheet, according to claim 1, wherein the predetermined portion is less than the total area of the thin sheet.

* * * * *